(12) United States Patent
Nakamura et al.

(10) Patent No.: US 6,324,871 B1
(45) Date of Patent: Dec. 4, 2001

(54) PROCESS FOR PRODUCING OPTICAL FIBER PREFORM

(75) Inventors: Motonori Nakamura; Yuichi Ohga; Toshio Danzuka, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/709,321

(22) Filed: Nov. 13, 2000

Related U.S. Application Data

(63) Continuation of application No. 08/909,685, filed on Aug. 12, 1997.

(30) Foreign Application Priority Data

Aug. 13, 1996 (JP) .................................................. 8-213902
May 22, 1997 (JP) .................................................. 9-131997

(51) Int. Cl.[7] .................................................. C03B 20/00
(52) U.S. Cl. .................................................. 65/421; 65/17.4; 65/384
(58) Field of Search .................................................. 65/17.4, 29.9, 65/377, 381, 385, 384, 421

(56) References Cited

U.S. PATENT DOCUMENTS

| | | |
|---|---|---|
| 4,731,103 | 3/1988 | Mizutani et al. . |
| 5,203,897 | 4/1993 | Powers et al. . |
| 5,211,732 | 5/1993 | Abbott et al. . |
| 5,558,693 | 9/1996 | Sarker . |
| 5,676,725 | 10/1997 | Ito et al. . |
| 5,685,889 | 11/1997 | Ohga et al. . |

FOREIGN PATENT DOCUMENTS

| | | |
|---|---|---|
| 0-153762 | 10/1998 | (EP) . |
| 2-172838 | 7/1990 | (JP) . |
| 4-13299 | 3/1992 | (JP) . |
| 4-310531 | 11/1992 | (JP) . |
| 4-367536 | 12/1992 | (JP) . |
| 2-592359 | 12/1996 | (JP) . |

OTHER PUBLICATIONS

Patent Abstracts of Japan, vol. 17, No. 236, May 13, 1993 & JP 04 367536 A (Fujikura Ltd.) Dec. 18, 1992, *abstract; figures 1,3*.
Patent Abstracts of Japan, vol. 14, No. 562, Dec. 13, 1990 & JP 02 243530 A (Fujikura Ltd.) Sep. 27, 1990, *abstract; figure 1*.
Patent Abstracts of Japan, vol. 17, No. 135, Mar. 19, 1993 & JP 04 310531 A (Yazaki Corp.), Nov. 2, 1992, *abstract; figures 1–4*.
Patent Abstracts of Japan, vol. 12, No. 148, May 7, 1988 & JP 62 265141 A (Sumitomo Electric Industries Ltd.), Nov. 18, 1987, *abstract*.

Primary Examiner—Sean Vincent
(74) Attorney, Agent, or Firm—McDermott, Will & Emery

(57) ABSTRACT

In a process for producing an optical fiber preform, a starting member and a glass synthesizing burner are reciprocated relative to each other so that fine glass particles synthesized with the burner are deposited layer by layer on the starting member, and a heating power of the glass synthesizing burner in a nonsteady outside diameter portion at either end of the soot preform is adjusted to control the temperature of the nonsteady outside diameter portion at either end against local elevation. The starting member is formed of a transparent glass rod that is held within a vessel and rotatable about its own axis, the burner is fitted on a lateral side of the vessel at right angles to the rotating axis of the starting member and is movable towards or away from the starting member.

2 Claims, 2 Drawing Sheets

PROCESS FOR PRODUCING OPTICAL FIBER PREFORM

This is a continuation of application Ser. No. 08/909,685, filed Aug. 12, 1997.

BACKGROUND OF THE INVENTION

1. Field of the Invention

The present invention relates to a process for producing an optical fiber preform by depositing fine glass particles around a starting member in the form of a transparent glass rod and, more particularly, to a process capable of producing an optical fiber preform of high quality by ensuring that the nonsteady outside diameter portion at either end of a soot preform is protected against local temperature elevation.

2. Description of the Related Art

One of the conventional processes for producing an optical fiber preform uses a starting member in the form of a transparent glass rod composed of either a core or a core cladding combination, which is installed either horizontally or vertically in a vessel and rotated about its own axis while gaseous glass forming materials are supplied into a burner to synthesize fine glass particles which are deposited on the starting member making reciprocal movement relative to the burner. This is generally referred to as an "Outside Vapor Phase Deposition method" and the resulting soot preform (optical fiber preform) is fused with heat until it vitrifies (turns into a transparent glass) thereby synthesizing a jacket (see, for example, Unexamined Japanese Patent Publication (kokai) No. Hei. 2-172838).

An exemplary apparatus for producing an optical fiber preform by the Outside Vapor Phase Deposition method (OVD method) is shown in FIG. 1. A vessel 1 has a starting member 2 fitted vertically as it is held on a rod 7 such that it is rotatable on its own axis and capable of recical movement in a vertical direction by means of an elevator 5. A glass synthesizing burner 3 is fitted on a lateral side of the vessel 1 at right angles to the rotating axis of the starting member 2 such that fine glass particles synthesized with the starting materials being supplied from a feed supply unit 8 are deposited on the starting member 2. The glass synthesizing burner 3 is adapted to be movable towards or away from the starting member 2 by means of a burner moving unit 4. An exhaust port 6 is provided on the lateral side of the vessel 1 which is remote from the glass synthesizing burner 3 and an exhaust containing any excess of the fine glass particles being synthesized is discharged through the port.

When an optical fiber preform is produced with the apparatus shown in FIG. 1, the middle portion of a soot preform 9 in FIG. 2 which is being formed around the starting member 2 is a steady outside diameter portion 10 having a constant outside diameter. However, a nonsteady outside diameter portion 11 having a varying outside diameter forms at both the upper and lower ends of the deposit. Since the burner makes a round trip in each of these end portions and both ends are smaller in outside diameter, hence, heat capacity, the temperature of the soot preform may rise locally if the heating power of the burner is constant. In addition, the supply of the starting materials for the synthesis of the fine glass particles is either reduced or stopped in the nonsteady outside diameter portion and, hence, given constant flow rates of hydrogen and oxygen, the surface temperature of the deposit will increase further. If a plurality of burners are used to synthesize the fine glass particles (soot), the supply of the starting materials is stopped in such an order that the supply from the outermost burner is stopped first and the supply from the second outermost burner is stopped thereafter in order to shorten the length of the nonsteady outside diameter portion at either end of the soot preform. However, this is another cause of the high likelihood for local temperature elevation. For example, when the target is moving at a constant speed; even if the burners are operated such that the temperature of the steady outside diameter portion is about 900° C., the temperature at either end of the soot preform may sometimes rise up to about 1,100° C. and, as a result, the glass deposit will have a bulk density gradient that introduces irregularities in hardness and the thermal expansion mismatch between the transparent glass rod and the soot preform will cause cracking in the soot. In addition, temperatures higher than 1,100° C. will cause vitrification.

A method is also known for producing rare earth incorporating quartz such as a quartz rod having a rare earth element added thereto; according to the method, a soot of fine glass particles is deposited on a rod of starting member to prepare a soot boule by a technique such as a VAD or OVD method and the soot boule is impregnated with an alcoholic solution of a rare earth metal chloride by immersion and thereafter dried and heated to vitrify thereby forming a rare earth incorporating quartz rod. A problem with this method is that the soot boule formed by a conventional technique such as a VAD process is apt to have a great difference in bulk density between the central and surface areas. If such a soot boule is impregnated with an alcoholic solution of a rare earth metal chloride, the content of the rare earth element will vary between the central and surface areas, making it difficult to produce a quartz rod having a uniform radial profile of rare earth element. In order to solve this problem, it has been proposed that a soot boule having smaller radial changes in bulk density should be produced by depositing a soot on a rod of starting member by an OVD method in such a way that the temperature of the peripheral surface of the soot is held constant (see Unexamined Japanese Patent Publication (Kokai) No. 4-367536).

As the outside diameter of the soot boule increases, its surface area and volume increase accordingly and a decreasing proportion of the soot boule is contacted by the flame of the burner. At the same time, the heat capacity of the soot boule per unit volume and, hence, its surface temperature will decrease. The process described in the preceding paragraph is primarily intended to deal with this situation and as the surface temperature of the soot boule decreases, the supply of hydrogen and oxygen into the burner is increased so that it will produce a greater amount of flame to maintain the surface temperature of the soot boule constant. In other words, the process under consideration is intended to maintain a constant temperature on the surface of the soot boule but not for preventing the above-described problem of local temperature elevation of the nonsteady outside diameter portion at either end of the soot preform.

A similar process for the production of an optical fiber preform has been proposed and it comprises basically the steps of depositing a soot of glass forming materials on a starting member by an OVD method and heating it to vitrify, with the additional step being included for controlling the bulk density of the soot being deposited by adjusting the distance from the soot deposition area to the burner and the temperature of that deposition area on the basis of the results of measurement of these factors (see Examined Japanese Patent Publication (kokoku) No. 4-13299). In the process of soot growth, the temperature of the soot deposition area fluctuates on account of the burner coming close to the soot and because of changes in such factors as the heat capacity of the soot and the efficiency of its cooling and as a result of this temperature fluctuation, the bulk density of the soot fluctuates in a radial direction, eventually leading to such problems as cracking in the soot and the fluctuation in the amount of dopants during sintering. The process under consideration is primarily intended to prevent these phenomena but not for preventing the local temperature elevation of the nonsteady outside diameter portion at either end of the soot preform.

A technology is also available for controlling the temperature near both ends of the soot preform and it is an apparatus for controlling a cladding forming burner comprising a gas source for supplying cladding forming gases, the cladding forming burner which burns the cladding forming gases to produce a flame that is thrown onto a porous core on which fine glass particles have been deposited, a flow rate regulating valve provided between the gas source and the cladding forming burner, a distance meter for measuring the distance over which the distal end of said core moves and a flow rate adjusting means by which the opening of said flow rate regulating valve is controlled to increase at a specified rate such that an empirically predetermined distance of movement is reached on the basis of an output value from said distance meter, characterized in that the porous cladding is formed as the temperature of the flame being thrown from said cladding forming burner is made lower at the distal end of the core than any other sites such that the refractive index profile created upon forming the cladding is generally uniform at any site in an axial direction (see Japanese Patent No. 2592359). This technology is primarily intended to deal with the abnormal index profile that occurs on account of the temperature fluctuations at the distal end of the core; in this process, fine glass particles are formed on the porous core, so unlike in the aforementioned case of depositing fine glass particles on the transparent glass rod, there will occur no problems due to thermal expansion mismatch such as cracking in the soot and irregularities in hardness.

SUMMARY OF THE INVENTION

It is an object of the present invention to provide a process for producing an optical fiber preform such that fine glass particles are deposited on a starting member in the form of a transparent glass rod with the temperature in either end portion of the soot preform being controlled against local elevation, thereby ensuring the production of an optical fiber preform of high quality and also by providing a process for producing an optical fiber preform such that the nonsteady outside portion at either end of the soot preform is prevented from increasing in volume, thereby allowing for the preform to be drawn into fiber at high yield.

In a process for producing an optical fiber preform according to the present invention, a starting member and a glass synthesizing burner are reciprocated relative to each other so that fine glass particles synthesized with the burner are deposited layer by layer on the starting member, and a heating power of the glass synthesizing burner in a nonsteady outside diameter portion at either end of the soot preform is adjusted to control the temperature of the nonsteady outside diameter portion at either end against local elevation. The starting member is formed of a transparent glass rod that is held within a vessel and rotatable about its own axis, the burner is fitted on a lateral side of the vessel at right angles to the rotating axis of the starting member and is movable towards or away from the starting member.

According to the process of the invention for producing an optical fiber preform, the heating power of a glass synthesizing burner in either end portion of a soot preform being formed on a starting member is adjusted to thereby protect both end portions of the glass deposit against local temperature elevation to ensure the production of an optical fiber preform of satisfactory quality. In addition to the adjustment of the heating power of the burner in either end portion of the glass deposit, the supply of glass forming materials to the burner may be reduced or stopped and by so doing, the increase in the volume of the nonsteady outside diameter portion of the glass deposit which would otherwise lower the yield of drawing the preform into an optical fiber can be effectively suppressed.

The present invention relates to a process for producing an optical fiber preform from a transparent glass rod composed of either a core or a core and cladding combination by depositing fine glass particles on the surface of the rod. The starting member, or the transparent glass rod composed of either a core or a core and cladding combination, which has the fine glass particles deposited thereon is hereunder referred to as an "optical fiber preform".

PREFERRED EMBODIMENTS OF THE INVENTION

Figure 1:
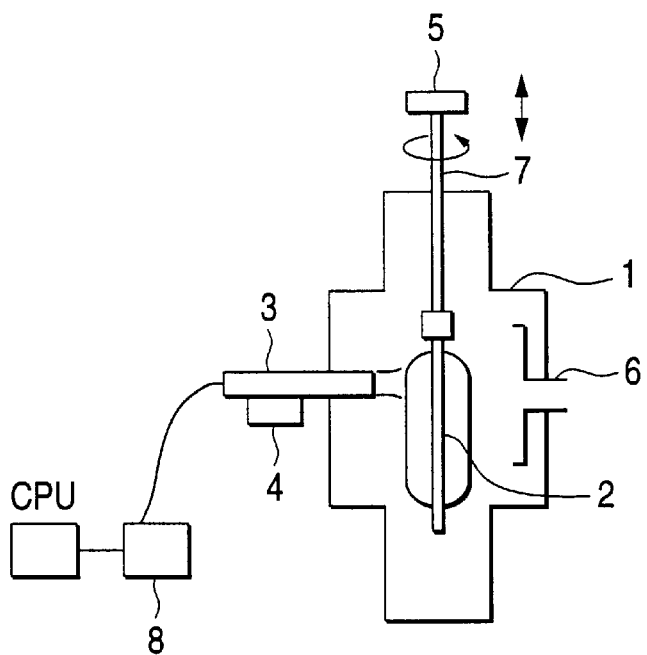
FIG. 1 is a schematic cross section showing an exemplary apparatus for implementing the process of the invention for producing an optical fiber preform.
Figure 2:
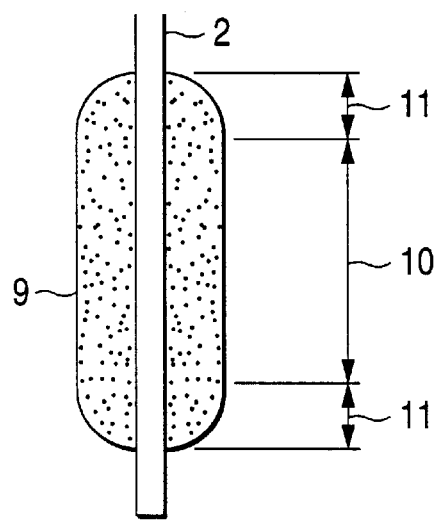
FIG. 2 illustrates how fine glass particles are deposited on a starting member.

The invention will now be described in detail with reference to the accompanying drawings. FIG. 1 is a schematic cross section of an exemplary apparatus for implementing the process of the invention. A vessel 1 has a starting member 2 fitted vertically as it is held on a rod 7 such that the starting member 2 is rotatable on its own axis and capable of reciprocal movement in a vertical direction by means of an elevator 5. The starting member 2 in the form of a transparent glass rod may be prepared by a method, in which a glass rod member is provided either horizontally or vertically in a vessel, this member is rotated on its axis as a starting member, gaseous glass forming materials are supplied into a core forming burner and a cladding forming burner to synthesize fine glass particles to be deposited on the rotating glass rod to form a core and cladding combination (the core having a different refractive index than the cladding to provide a desired index pattern), and the resulting soot preform is dehydrated and fused with heat to vitrify. A glass synthesizing burner 3 is fitted on a lateral side of the vessel 1 at right angles to the rotating axis of the starting member 2, and fine glass particles are synthesized from the starting materials being supplied from a feed supply unit 8 and are deposited on the starting member 2.

The glass synthesizing burner 3 is movable towards or away from the starting member 2 by means of a burner moving unit 4. The glass synthesizing burner 3 is usually a multi-tubular burner consisting of a plurality of tubes, through which silicon tetrachloride, oxygen, hydrogen and other necessary gases are supplied so that fine glass particles are synthesized and deposited on the starting member 2. As the outside diameter of the soot preform increases, the burner is retracted to adjust the distance from the surface of the deposit. In addition, in order to maintain the surface temperature within an appropriate range, the flow rates of gases, in particular, hydrogen which greatly contribution to the heating efficiency, are increased gradually thereby enhancing the heating power of the burner 3. An exhaust port 6 is provided on the lateral side of the vessel 1 which is remote from the glass synthesizing burner 3 and an exhaust containing any excess of the fine glass particles being synthesized is discharged through the port.

When an optical fiber preform is produced by the apparatus shown in FIG. 1, the fine glass particles are deposited on the starting member 2 with the surface temperature of the steady outside diameter portion of the soot preform being held at a specified value which is typically in a range of from 800 to 1,100° C., preferably from 900 to 1,000° C. If the surface temperature of the steady outside diameter portion is less than 800° C., the soot preform has such a low bulk density that it is apt to suffer the problem of "cracking in the soot". In addition, the optical fiber preform to be eventually produced will have an undesirably small size. If the surface temperature of the steady outside diameter portion exceeds 1,100° C., the deposited fine glass particles may fuse together and vitrify to yield only a substandard product.

When the apparatus is operated under such conditions that the steady outside diameter portion of the soot preform is held at the specified temperature, the burner returns at either end portion of the soot preform and hence both ends are heated twice within a short period of time. In addition, both ends are smaller in outside diameter, hence, heat capacity; therefore, the temperature of the soot preform rises locally if the heating power of the burner is kept constant. To deal with this problem, the present invention adjusts the heating power of the glass synthesizing burner in the nonsteady outside diameter portion at either end of the soot preform such that the temperature of that nonsteady outside diameter portion at either end is controlled against local elevation. Specifically, the power heating of the glass synthesizing burner is adjusted such that the temperature of the nonsteady outside diameter portion at either end of the soot preform is within a range of 800 to 1,100° C., preferably 900 to 1,000° C.

While various methods may be employed for adjusting the heating power of the glass synthesizing burner, an example is changing the flow rates (or composition) of gases to be supplied into the glass synthesizing burner. Specifically, the fed gas composition (principally the flow rates of oxygen and hydrogen) at the time the glass synthesizing burner is directed to the nonsteady outside diameter portion at either end of the soot preform is varied to control the heating power of the burner such that it is weaker at both ends of the glass deposit than any other portions.

Figure 3:
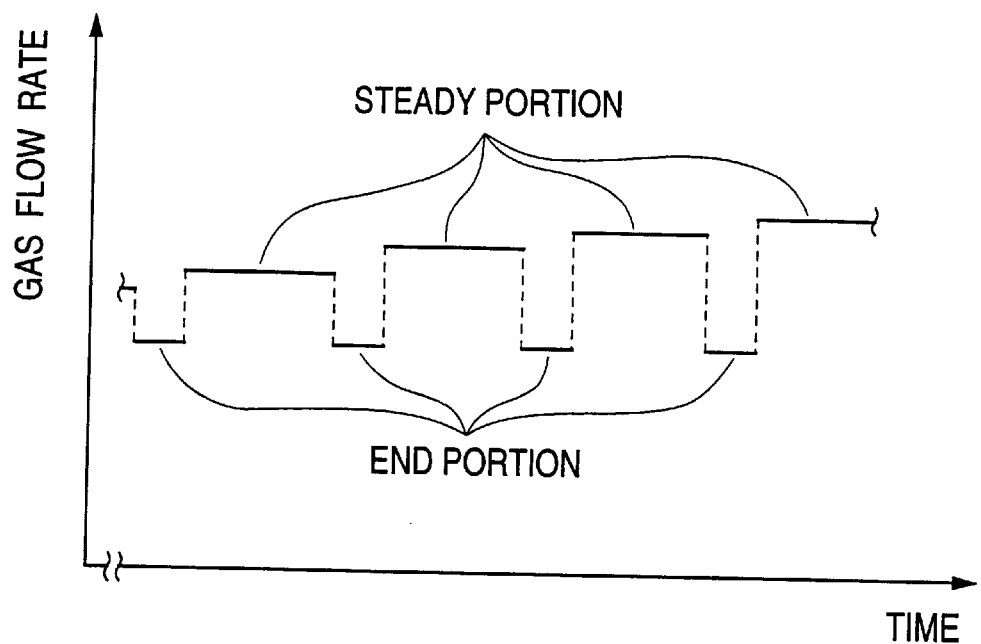
FIG. 3 illustrates an exemplary pattern for controlling the supply of a glass forming gas to a burner according to the process of the invention.

FIG. 3 shows an exemplary pattern of the flow rate of a feed gas (hydrogen) that may be adopted in implementing this method. In the steady outside diameter portion, the hydrogen flow rate is increased progressively with the increasing outside diameter as usual whereas a smaller constant flow rate of hydrogen is supplied in the nonsteady outside diameter portion. This flow rate pattern can suppress extreme temperature rise at either end of the soot preform. It should be noted that the gas flow rate at both ends of the soot preform need not necessarily be constant and it may be increased or decreased depending on the case. The change in flow rate need not necessarily be monotonic and it may be stepwise.

Alternatively, controlling the supply of oxygen gas is effective. Even if the hydrogen flow rate is reduced, the flame of the burner may reach the surface of the deposit if the flow velocity of oxygen is high enough. Consequently, a temperature may raise over a certain range although it is very narrow. As a result, the temperature or the nonsteady outside diameter portion may increase. This phenomenon becomes pronounced if the ratio of oxygen flow rate to the cross-sectional area of the port through which the oxygen flows is high, namely, if the flow rate of oxygen gas is high. Therefore, controlling the supply of oxygen is a particularly effective one with a burner of a multi-nozzle type in which the oxygen port is of a very small diameter.

The temperature of the nonsteady outside diameter portion can also be adjusted without supplying oxygen but by creating a flame from hydrogen and the oxygen in the air within the reaction vessel. Although the surface of the soot is scorched by a weak flame traversing a wide area, this is a preferred embodiment since a uniform temperature profile can be provided for the entire surface.

Yet another means of adjusting the heating power of the glass synthesizing burner is as follows: when the reciprocating starting member comes to the position where the flame of the glass synthesizing burner touches either end portion of the soot preform, the burner is retracted to increase the distance between its distal end and the surface of the glass deposit, thereby attenuating the heating of the surface of the deposit.

Figure 4:
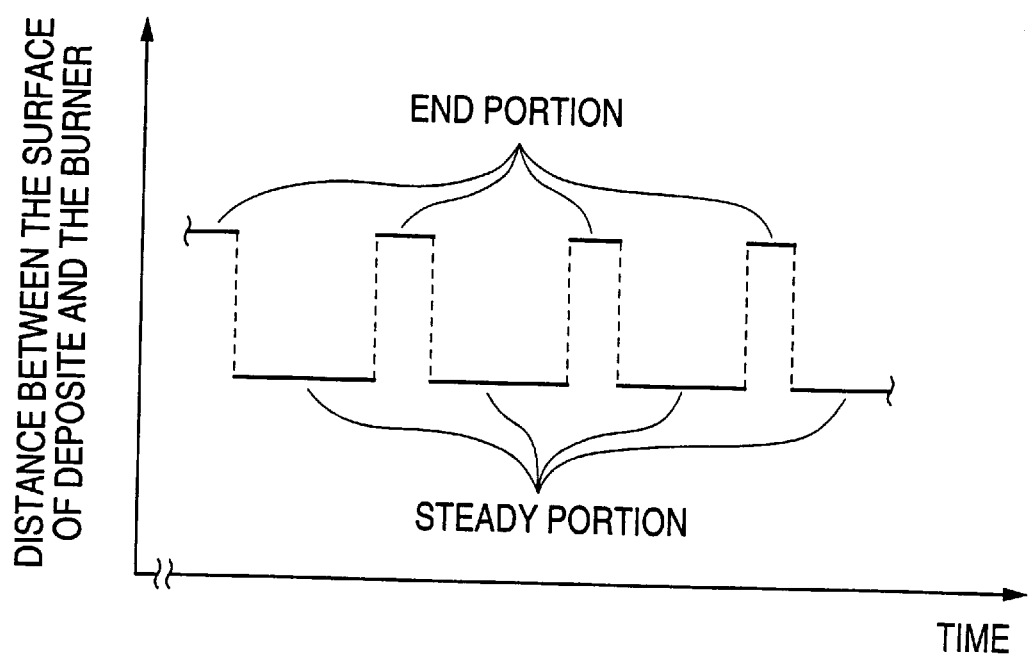
FIG. 4 illustrates an exemplary pattern for controlling the distance between the burner and the surface of the glass deposit according to the process of the invention.

A pattern of the change that occurs in the distance between the distal end of the burner and the surf ace of the glass deposit by adopting the above-described method is shown in FIG. 4. When the starting member comes to the position where the flame of the burner touches either end portion of the glass deposit, the burner is retracted to increase the distance between the flame and the surface of the deposit and the flame is spread over a wider area to thereby reduce the heating efficiency (heating power).

In order to adjust the heating power of the glass synthesizing burner, the surface temperature of the soot preform is monitored at all times and, on the basis of the measured temperature, an appropriate factor such as the flow rate of a feed gas or the distance between the burner and the surface of the glass deposit are adjusted so that the surface temperature of the deposit is held within a specified range. If there are areas where the temperature elevation is anticipated, the apparatus may be preset so that the supply of a feed gas is reduced or the distance between the burner and the surface of the glass deposit is increased in those areas.

If the nonsteady outside diameter portion at either end of the soot preform forms is increased, the yield of drawing into optical fiber is lowered. In addition, fine glass particles adheres to an area outside of the point from which the burner returns. Consequently, a soft and easy-to-crack mass may form at both ends of the soot preform. In order to prevent to increase in the volume of the nonsteady outside diameter portion of the glass deposit, the supply of glass forming materials into the burner is preferably reduced or stopped in that nonsteady portion (where the burner makes a round trip). If, in this case, the conditions of oxygen and hydrogen supply are held constant, the combustion gases (oxygen and hydrogen) which have so far contributed to the reaction with the glass forming materials may begin to contribute to the heating of the surface of the deposit, the chance of temperature elevation is increased. Therefore, the heating power of the burner need be adjusted by one of the aforementioned methods such as controlling the flow rate of hydrogen and/or oxygen or the distance between the distal end of the burner and the surface of the glass deposit.

Although only one unit of glass synthesizing burner is shown in FIG. 1, if required as in the case of producing an elongated optical fiber preform, a plurality of burners may be provided parallel to the longitudinal axis of the starting member. In this case of using more than one glass synthesizing burner to produce a soot preform, it is also preferred to reduce or stop the supply of glass forming materials to thereby prevent the increase in the volume of the nonsteady outside diameter portion, provided that the supply from the burner which throws a flame that first comes into contact with the nonsteady outside diameter portion of the glass deposit on the starting member moving relative to the burner is reduced or stopped first. Stated more specifically, the supply of the glass forming material is preferably reduced or stopped in such an order that the supply from the burner which throws a flame that first reaches either end of the soot preform is reduced or stopped first and the supply from the burner which throws a flame that next comes into contact with either end of the glass deposit is reduced or stopped next, thereby suppressing the synthesis of fine glass particles in the nonsteady outside diameter portion of the glass deposit.

Also in this case, the heating power of each burner is adjusted at the time when it comes to the position where the flame is directed to the nonsteady outside diameter portion of the soot preform and the adjustment of burner's heating power should coincide with the timing of sequentially reducing or stopping the supply of the glass forming materials into the plurality of burners. Therefore, in the case of synthesizing fine glass particles using more than one burner, the heating power of the individual burners have to be adjusted in accordance with the changes in the flow rates of glass forming materials that occur in the end portions of the soot deposition end portion.

Thus, the power of the glass synthesizing burner or burners in heating the surface of the soot preform is attenuated in the position where the burner flame contacts the nonsteady outside diameter portion at either end of the glass deposit and this prevents the local elevation of the temperature in that area, thereby assuring the production of a high-quality optical fiber preform.

EXAMPLES

The present invention will now be described more detail by the following examples.

Example 1

An optical fiber preform was produced using an apparatus of a structure shown in FIG. 1. A starting member 2 (o.d., 15 mm) which was formed by a VAD prepared transparent glass rod having a core and a cladding was rotated on its own axis at a speed of 30 rpm as it was moved to reciprocate in a vertical direction at a speed of 50 mm/min while, at the same time, silicon tetrachloride, oxygen, hydrogen and argon were supplied into a glass synthesizing burner 3 such that a hydrolytic reaction was caused to occur within the flame from the burner, thereby forming fine glass particles that were deposited on the starting member 2 until it grew to an outside diameter of 100 mm. In the meantime, the burner 3 was retracted gradually to ensure that the distance between the burner and the surface of the soot preform would be held substantially constant. The glass deposit was 600 mm long and had a nonsteady outside diameter portion in an area extending 100 mm from both ends.

The burner 3 consisted of eight concentric tubes through which $SiCl_4$, $H_2$, Ar, $O_2$, Ar, $H_2$, Ar and $O_2$ were supplied, with $SiCl_4$ being supplied into the innermost tube. The respective gases were supplied in the following volumes: $SiCl_4$, 2 liter/min; $O_2$, 80 liter/min; $H_2$, 100 liter/min; and Ar, 20 liter/min. The flow rate of hydrogen was 50 liter/min at the start of reaction and gradually increased to a final value of 100 liter/min.

An optical fiber preform was produced with the temperature of the steady outside diameter portion of the soot preform being held at 920° C. whereas the hydrogen supply to the nonsteady outside diameter portion extending 100 mm from both ends was changed within 40 to 100% of the supply to the steady portion, thereby changing the temperature in either end portion of the glass deposit. When the temperature in either end portion of the glass deposit was less than 800° C. (with the hydrogen supply being 40% of the supply to the steady outside diameter portion), the soot in both end portions was so soft as to develop cracks. On the other hand, when the temperature in either end portion of the glass deposit was in excess of 1,100° C., the individual fine glass particles in the surface of the deposit becomes harder per unit volume and started to undergo partial vitrification, thereby forming tubers on the surface of the deposit; such areas were prone to become hotter than other areas, causing local temperature elevation, and due to the temperature difference from the surrounding areas, cracking occurred in the surface of the deposit. When the temperature in both end portions of the glass deposit was held within the range of 800 to 1,100° C. (with the hydrogen supply being 50 to 70% of the supply to the steady outside diameter portion), good results were obtained without occurrence of the above-described irregularities and cracking in the soot. The optical fiber preform produced under these conditions was held in a furnace at a sufficiently high temperature to make it transparent and it was subsequently drawn into an optical fiber of good characteristics.

Example 2

Optical fiber preforms were produced under the same conditions as in Example 1, except that the heating power of the glass synthesizing burner 3 in the nonsteady outside diameter portion extending 100 mm from both ends of the soot preform was adjusted by controlling the flow rates of oxygen and hydrogen. Specifically, in either end portion of the glass deposit, the hydrogen supply was controlled to be 70% of the flow rate to the steady portion and the oxygen supply being 20 to 50% of the flow rate to the steady portion; the temperature in both end portions was in the range of 900 to 1,050° C. and a satisfactory optical fiber preform was produced without any irregularities and cracking in the soot. When the supply of oxygen was stopped with the hydrogen supply being set at 90% of the flow rate to the steady portion, the temperature in both end portions was in the range of 800 to 900° C. and a satisfactory optical fiber preform was produced without any irregularities and cracking in the soot.

Example 3

An optical fiber preform was produced under the following conditions: the temperature in the outside steady diameter portion of the soot preform was set at 920° C.; and in the nonsteady portion extending 100 mm from either end of the glass deposit, the supply of a glass forming material ($SiCl_4$) was stopped and the hydrogen supply was 50 to 70% of the flow rate to the steady portion as in Example 1. The temperature in both end portions of the glass deposit was 1,150° C., which was higher than when SiCl$_4$ was supplied to the nonsteady portion, causing vitrification and cracking in the soot in both end portions of the glass deposit. Hence, another soot depositing operation was performed with the hydrogen supply being changed to lie in the range of 40 to 60% of the flow rate to the steady portion and a satisfactory preform was produced without any irregularities and cracking in the soot. Also absent was fluffiness in the soot deposited outside of the point from which the burner returned and there was no recognizable cracking that would otherwise occur in the soot.

Example 4

Optical fiber preforms were produced under the same conditions as in Example 1, except that in the nonsteady portion extending 100 mm from either end of the glass deposit, the supply of SiCl$_4$ was stopped and the heating power of the glass synthesizing burner 3 was adjusted by controlling the supply of oxygen or the supplies of both hydrogen and oxygen. Specifically, when the supply of SiCl$_4$ was stopped and the supply of oxygen was completely stopped in both end portions of the glass deposit, the temperature in either end portion was within the range of 800 to 1,100° C. and satisfactory results were obtained without any irregularities and cracking in the soot. When the hydrogen supply was reduced to 80% of the flow rate to the steady portion and the oxygen flow rate was adjusted to 20 to 40% of the supply to the steady portion, the temperature in either end portion was within the range of 900 to 1,100° C. and a satisfactory optical fiber preform was obtained.

Example 5

An optical fiber preform was produced under the same conditions as in Example 1, except that the heating power of the glass synthesizing burner 3 in the nonsteady outside diameter portion extending 100 mm from either end of the soot preform was adjusted by a different method. Sated specifically, in the nonsteady portion extending 100 mm from either end of the glass deposit, the distance of the burner 3 from the surface of the glass deposit was increased from 80 mm (when the burner was in the steady portion) to 160 mm such that the temperature in either end portion was held at 850° C. The optical fiber preform produced had satisfactory characteristics without any irregularities and cracking in the soot. It was held in a furnace at a sufficiently high temperature to make it transparent and it was subsequently drawn into an optical fiber of good characteristics.

Example 6

A soot preform was formed on a glass member having a core/cladding structure using three glass synthesizing burners that were positioned parallel to the glass member at spacings of 150 mm. The respective burners were supplied with glass forming gases under the same conditions as in Example 1 and the glass deposit having a length of 800 mm was grown to an outside diameter of 100 mm. The supply of SiCl$_4$ to the burners was sequentially stopped in such a way that the supply to the outer burner was stopped at a distance of 450 mm from the point of the glass deposit from which it returned, the supply to the central burner stopped at a distance of 300 mm from the return point, and the supply to the inner burner stopped at a distance of 50 mm from the return point, thereby ensuring that the nonsteady outside diameter portion of the glass deposit would not become unduly long. In addition, the hydrogen flow rate was controlled in that area to perform the necessary temperature adjustment. When the soot depositing operation was performed with the hydrogen supply to the nonsteady portion being adjusted to 30 to 60% of the flow rate to the steady portion, the temperature on the surface of the deposit was within the range of 950 to 1,100° C. and a satisfactory optical fiber preform having neither irregularities nor cracking in the soot was produced, with the nonsteady outside diameter portion being formed in an area extending 120 mm from both ends.

Example 7

A soot preform was prepared and grown to an outside diameter of 100 mm as in Example 6, except that the temperature in both end portions of the deposit was adjusted by controlling the flow rate of oxygen or the flow rates of both oxygen and hydrogen. The glass deposit had an overall length of 800 mm, with the nonsteady outside diameter portion being formed in an area extending 120 mm from both ends. When the supply of oxygen to both end portions of the glass deposit was completely stopped, the temperature in either end portion was 850 to 1,100° C., producing satisfactory results in the absence of any irregularities and cracking in the soot. When the hydrogen supply to the nonsteady portion was reduced to 70% of the supply to the steady portion and the flow rate of oxygen adjusted to 20 to 40% of the supply to the steady portion, the temperature in either end portion was within the range of 900 to 1,100° C., producing a satisfactory optical fiber preform.

Example 8

A soot preform was prepared as in Examples 6 and 7, except that the supplies of the glass forming materials to either end portion were not changed but the flow rate of hydrogen and/or oxygen was controlled to perform the necessary temperature adjustment. The glass deposit had an overall length of 1,200 mm, with the nonsteady outside diameter portion being formed in an area extending 400 mm from both ends. When the supply of hydrogen to either end portion of the glass deposit was adjusted to 40 to 60% of the setting for the steady portion, the temperature on the surface of the deposit was 900 to 1,050° C. When the oxygen supply to either end portion was completely stopped, the temperature on the surface of the deposit was 1,000 to 1,100° C. When the hydrogen supply to either end portion was adjusted to 80% of the setting for the steady portion and the oxygen supply was controlled to lie within the range of 20 to 40% of the setting for the steady portion, the temperature on the surface of the deposit was 900 to 1,000° C. All samples of optical fiber preform prepared under these conditions were satisfactory in the absence of any irregularities and cracking in the soot.

What is claimed is:

1. A process for producing an optical fiber preform, comprising the steps of:

reciprocating a starting member and a glass synthesizing burner relative to each other so that fine glass particles synthesized with said burner are deposited layer by layer on said starting member to form a soot preform, said starting member being formed of a transparent glass rod that is held within a vessel and rotatable about its own axis, said burner being fitted on a lateral side of the vessel and rotatable about its own axis, said burner being fitted being movable towards or away from said starting member; adjusting a heating power of the glass synthesizing burner in a nonsteady-outside-diameter portion at either end of the soot preform formed on the starting material to control a temperature of the nonsteady-outside-diameter portion at either end against local elevation; and reducing or stopping the supply starting materials for the fine glass particles into the glass synthesizing burner in said nonsteady-outside-diameter portion.

2. A process for producing an optical fiber preform, comprising the steps of:

reciprocating a starting member and a glass synthesizing burner relative to each other so that fine glass particles synthesized with said burner are deposited layer by layer on said starting member to form a soot preform, said starting member being formed of a transparent glass rod that is held within a vessel and rotatable about its own axis, said burner being fitted on a lateral side of the vessel at right angles to the rotating axis of said starting member and being movable towards or away from said starting member; and adjusting a heating power of the glass synthesizing burner in a nonsteady-outside-diameter portion at either end of the soot preform formed on the starting material to control a temperature of the nonsteady-outside-diameter portion at either end against local elevation;

wherein the heating power of the glass synthesizing burner is adjusted so that the temperature of the steady-outside-diameter portion of the soot preform is held at 800 to 1,100° C. and the temperature of the nonsteady-outside-diameter portion at either end of the soot preform is within a range of 800 to 1,100° C.

* * * * *